United States Patent [19]
Lauf et al.

[11] Patent Number: 5,481,428
[45] Date of Patent: Jan. 2, 1996

[54] PROCESS FOR MANUFACTURING MULTILAYER CAPACITORS

[75] Inventors: Robert J. Lauf, Oak Ridge; Cressie E. Holcombe, Knoxville; Norman L. Dykes, Oak Ridge, all of Tenn.

[73] Assignee: Martin Marietta Energy Systems, Inc., Oak Ridge, Tenn.

[21] Appl. No.: 900,886

[22] Filed: Jun. 18, 1992

[51] Int. Cl.$^6$ .................................................. H01G 4/008
[52] U.S. Cl. ..................... 361/305; 361/321.3; 29/25.42; 219/10.55 M
[58] Field of Search ........................... 29/25.42; 264/61, 264/26, 25; 361/320, 321, 328, 329, 305, 321.3; 419/23; 219/10.55 R, 10.55 M

[56] References Cited

U.S. PATENT DOCUMENTS

| | | | |
|---|---|---|---|
| 3,585,258 | 6/1971 | Levinson | 219/10.55 R |
| 4,147,911 | 4/1979 | Nishitani | 219/10.55 M |
| 4,520,422 | 5/1985 | Borlano | 361/305 |
| 4,810,846 | 3/1989 | Holcombe et al. | 219/10.55 |
| 4,828,961 | 5/1989 | Lau et al. | 430/198 |
| 4,880,578 | 11/1989 | Holcombe et al. | 264/26 |
| 4,938,673 | 7/1990 | Adrian | 419/23 |
| 4,972,175 | 11/1990 | MacPherson | 340/550 |
| 5,001,598 | 3/1991 | Constantine | 361/305 |
| 5,004,715 | 4/1991 | Hakotani et al. | 501/136 |
| 5,010,443 | 4/1991 | Maber | 361/321 |
| 5,013,694 | 5/1991 | Holcombe et al. | 219/10.55 M |
| 5,164,130 | 11/1992 | Holcombe et al. | 264/26 |

FOREIGN PATENT DOCUMENTS

| | | |
|---|---|---|
| 1375926 | 12/1974 | United Kingdom . |
| 2220513 | 11/1990 | United Kingdom . |

*Primary Examiner*—Kristine L. Kincaid
*Assistant Examiner*—Michael D. Switzer
*Attorney, Agent, or Firm*—George L. Craig; James M. Spicer; Harold W. Adams

[57] ABSTRACT

The invention is directed to a method of manufacture of multilayer electrical components, especially capacitors, and components made by such a method. High capacitance dielectric materials and low cost metallizations layered with such dielectrics may be fabricated as multilayer electrical components by sintering the metallizations and the dielectrics during the fabrication process by application of microwave radiation.

21 Claims, 3 Drawing Sheets

PROCESS FOR MANUFACTURING MULTILAYER CAPACITORS

This invention was made with Government support under Contract No. DE-AC05-84OR21400 awarded by the U.S. Department of Energy to Martin Marietta Energy Systems, Inc. The Government has certain rights in this invention.

BACKGROUND OF INVENTION

1. Field of Invention

The present invention relates to a method for making multilayer electrical components and more particularly to a method of making multilayer capacitors.

2. Description of Prior Art

Multilayer electrical components are presently fabricated according to three principal processes. A first process involves mixing compositions of selected ceramic dielectrics with selected dopants and/or sintering flux components to control the distribution of the ceramic components within the mixture prior to thermal and/or pressure sintering. With this process, the mixture control conditions are critical to maintain homogeneous distribution of the ceramic components and to control the sintering with reactivity promoters and inhibitors during the fabrication process.

A second process involves generating photomasks by photolithography in which a photosensitive emulsion or metal coating is deposited on a dielectric substrate in a pattern forming one or more electric circuits and then the emulsion or metal coating is selectively etched to form ceramic/metal layer. Two or more of these ceramic/metal layers are then bonded together to form a desired electrical component. Bonding of the masks is typically performed with thermal and/or pressure techniques and registration of the masks is critical to performance of the component. The process is generally very complex, time consuming and expensive according to the pattern complexity and number of the masks.

The third principal process involves preparing a ceramic dielectric layer using a doctor blade, roll compaction or similar technique and is conventionally known as tape casting. The process typically involves mixing a ceramic dielectric, especially particulates, with liquid organic binders and painting the mixture onto a flat drying surface. When dry, the mixture is peeled off as thin flexible tapes which are then covered with a pattern of particulate metal electrodes, typically by screen printing. The electrodes are printed on the tapes such that when the tapes are overlaid the electrodes of overlapping layers are in staggered formation. When the multilayer tapes are subsequently cut into pieces to form discrete multilayer electrical components, adjacent electrodes overlap internal to the component but have edges protruding from alternate sides of the component. The green, laminated component is then carefully sintered by thermal and/or pressure techniques to densify both the ceramic dielectric and the metallic electrodes. Additional external electrodes are then painted on the protruding internal electrodes. Wires are then attached to the external electrodes to form the finished component. With the last described process, because of the generally high sintering temperature needed by the ceramic dielectric, the metal electrodes must typically be high-Pd alloys to prevent volatilization of the Ag. Although ceramic dielectrics are available that are compatible with Ag-rich electrodes and that may be sintered at lower temperatures, such dielectrics have less desirable electrical properties. An undesirable choice in electrical properties of the finished component is thus presented because the cost of the Pd in the component can represent as much as half the cost of the finished component. Additionally, conventional sintering of some laminated structures such as multilayer substrates and packages typically involves sintering in belt furnaces which imposes an upper limit on structure size since the leading edge of the structure begins to shrink, leading to warping or fracture of the component, if the laminated structure is too large.

Application of microwave radiation to materials is becoming increasingly important in this last process as a tool for more efficient and effective sintering of several classes of materials. For example, U.S. Pat. No. 4,880,578 (Nov. 14, 1989); U.S. Pat. No. 4,810,846 (Mar. 7, 1989); and pending applications Ser. No. 07/781,781 and Ser. No. 07/853,474 describe use of such microwave radiation. The above-mentioned patents with issue dates in parentheses and the cited patent applications are all assigned to the same assignee as the present application and are incorporated herein by reference.

However, application of microwave radiation to multilayer electrical component structures having combined metallization and dielectric layers has been considered impractical because of arcing between the metallic layers and reaction between the materials and/or the furnace. Avoiding this limitation would enhance applications of microwave radiation to dielectric/metal composites such as multilayer capacitors, transducers, substrates, semiconductor chip carriers and the like.

The present invention avoids the limitations of the above described processes by a novel sintering process resulting in multilayer electrical components, especially capacitors, that possess the desirable dielectric properties of materials fired at high temperatures and the lower cost of Ag-rich electrodes.

SUMMARY OF THE INVENTION

The principal object of invention is a novel process for producing multilayer electrical components, especially capacitors. A further object of invention is a multilayer capacitor having a high-capacitance dielectric and low-cost metallized electrodes. Further and other objects of invention will become apparent from the description contained herein.

The principal object of invention is achieved by alternating layers of a metal material in an organic binder material and a ceramic dielectric material in an organic binder material to form a lamination; dimensioning the lamination to a desired size; heating the lamination to remove the organic binder material; packing the lamination in a refractory insulating material; and sintering the ceramic and metal materials in the lamination by applying microwave radiation.

DESCRIPTION OF THE PREFERRED EMBODIMENTS

Figure 1:
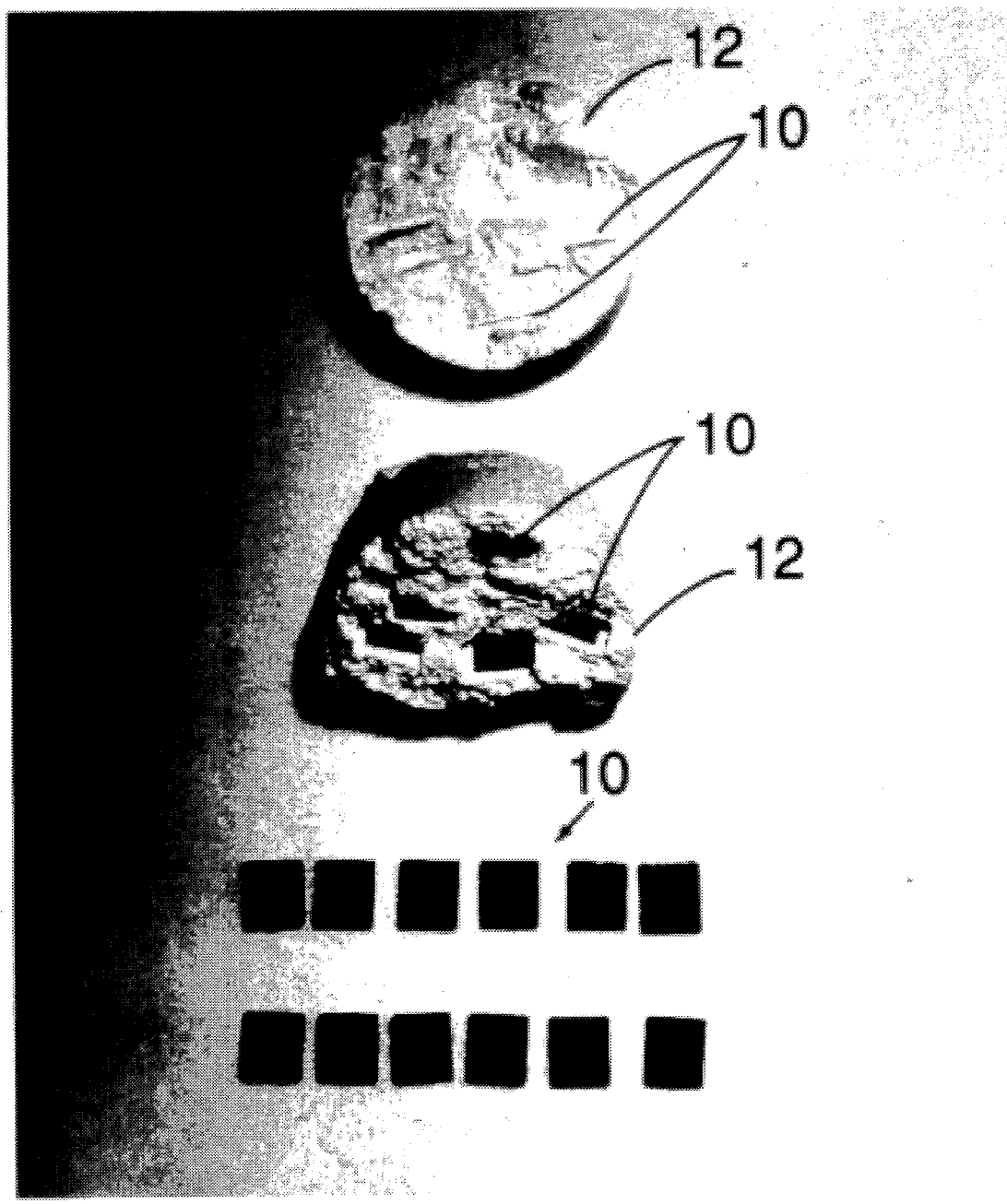
FIG. 1 is a photograph of capacitors made according to the present invention partially removed from the packing material.

It has been previously demonstrated that microwave sintering enhances the densification kinetics of some simple oxide ceramics such as alumina. Such enhancement decreases sintering temperature and/or time. However, when fabricating multilayer structures of metal and ceramic materials, for example multilayer capacitors, the presence of internal metallizations creates problems during sintering such as arcing between exposed electrode edges. Further, the room-temperature dielectric loss of high capacitance dielectrics meeting EIA specifications RS198-C and known in the electronics industry under standards designated as Z5U, NPO, Y5F, Y5U, S2L, S2M, W7R or COG is to low to couple effectively with the microwave energy at reasonable power levels. By way of example and not limitation, a pair of such ceramic dielectrics meeting such specifications are barium titanate and neodymium titanate.

According to the present invention, it has been found that by packing the green, i.e. unsintered, multilayer structures, for example capacitors, in certain refractory insulating materials, the materials within the structures can be sintered to high density without arcing, sintering temperature reduced and better control of the sintering chemistry achieved because the packing materials maintain a protective overpressure of volatile additives during sintering.

Where the packing material is zirconia, yttria, boron nitride or aluminum nitride, in either fiber or powder form, it couples to the microwave radiation applied during sintering allowing the multilayer structures contained therein to heat up. The multilayer structures then absorb most of the applied microwave radiation and the ceramic dielectrics and metallizations sinter to high density without arcing and without any reaction between the structures and the packing material.

An additional advantage achieved with the present invention is that the packing materials used are quite friable and are easily recycled. Therefore the packing material can be preconditioned with additives of volatile oxides that would otherwise be lost from the structures during sintering. Two examples of the novel process of the present invention are given below:

Example 1

A tape-cast particulate metal and ceramic dielectric formulation in an organic binder was used as the starting material for the multilayer structure. Such a formulation, for example barium titanate, is obtainable under the electrical component industry designation Z5U. Other ceramic dielectric formulations, such as lead perovskite, may be used so long as the performance of the formulation's electrical properties versus temperature correspond to EIA specification RS198-C. The electrodes used in this example are 90%Pd–10%Ag which correspond to compositions found in conventional fabrication techniques. According to the novel microwave sintering taught in the present application, electrode compositions having little or no Pd are predicted. A capacitor made from conventional compositions and according to conventional techniques would be fired at 1375° C.

The material was obtained as multilayer laminations, precut to the size of some standard size capacitors, with randomly-arranged internal electrodes. The green laminations contained approximately 10 wt % organics as vehicles and binder materials in the tape casting and printing operations. The organics were subsequently removed from the multilayer laminations by heating the laminations in a nitrogen atmosphere at 1° C./min to 300° C.; 2 hours at 300° C.; 1° C./min to 600° C.; and 4 hours at 600° C., during which the nitrogen was removed and air was admitted to allow any residual organics to burn off.

Figure 2:
FIG. 2 is an SEM photograph of the internal microstructure of a sintered multilayer structure made according to the present invention.

The laminations were then packed in a crucible filled with yttria powder and microwave sintered at an average temperature of 1285° C. Heat generation within the crucible using microwave radiation may be done volumetrically and uniformly rather than having a heat gradient from the exterior of the crucible resulting in components at the center having a different thermal history than those near the exterior of the crucible. Following sintering, the parts 10 were easily removed from the packing material 12 and are shown in FIG. 1. The laminations had the right color and had undergone significant shrinkage, indicating that proper sintering had been achieved. FIG. 2 is a scanning electron microscope (SEM) photograph of a fracture surface of a multilayer structure made according to the teachings of the present invention and shows that both the ceramic dielectric 14 material and the internal electrode structures 16 look good. That is, the metallic electrodes 16 are well-defined and relatively planar rather than dispersed throughout the dielectric or melted as would be the case with excessive heating.

Example 2

The starting materials for this example are the same as that used in Example 1 except that in these multilayer laminations, the electrodes 16 are arranged as they would be in a normal capacitor, for example. Therefore, it is possible to make electrical measurements on the finished components for comparison with conventionally fabricated multilayer capacitors.

The green laminations were treated as described in Example 1 to remove organics and, for sintering, the parts were packed in zirconia fiber. Sintering of the laminations was done in an air atmosphere for one hour at 1225°–1267° C.

Figure 3A:
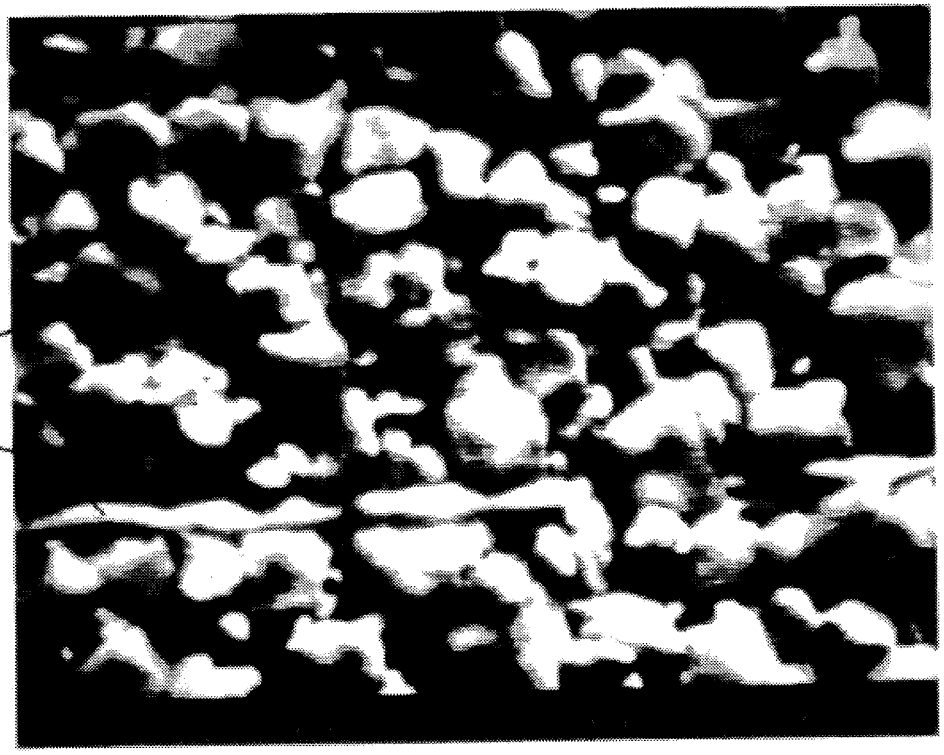
FIG. 3A is an SEM photograph at 1000X of one edge of a multilayer structure made according to the present invention.
Figure 3B:
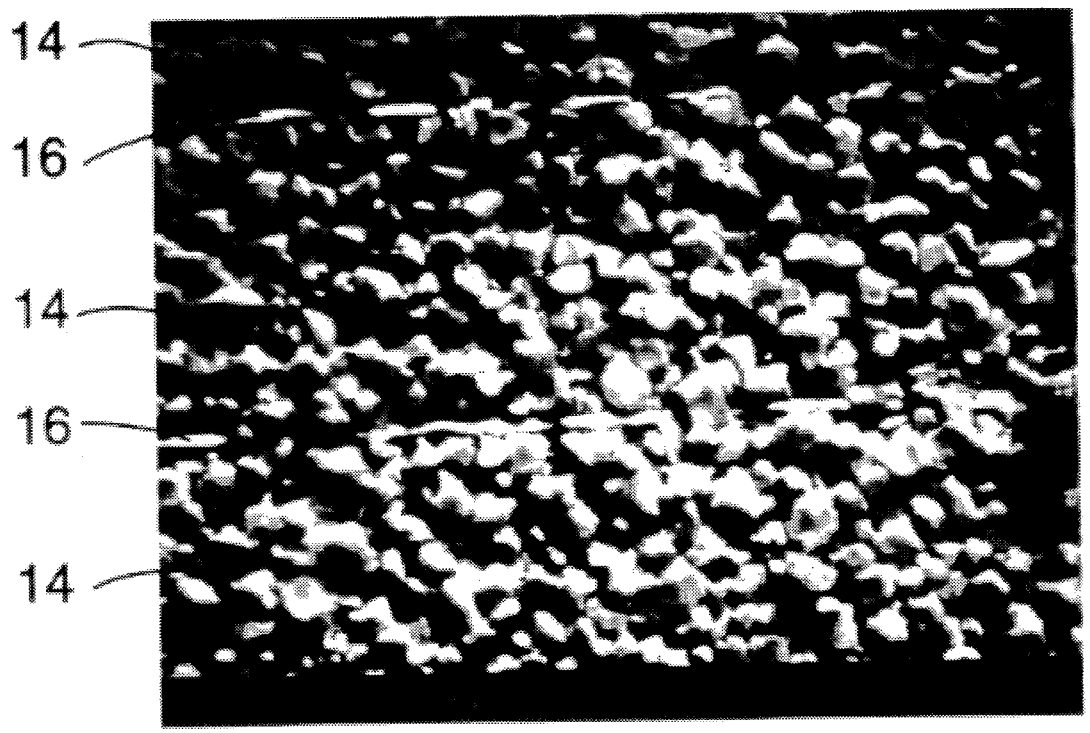
FIG. 3B is an SEM photograph at 500X of one edge of a multilayer structure made according to the present invention.

The sintered components were easily removed from the packing material. Referring to FIG. 3A, a SEM photograph at 1000X is shown of one edge of such a microwave sintered capacitor showing the electrodes 16 emerging from the barium titanate ceramic dielectric 14. FIG. 3B shows a SEM photograph at 500X of the same edge. As in the previous example, the structures of the ceramic dielectric and the metallic electrode structures are normal. Further, there is no apparent arcing or reaction between the electrodes 16 and the packing material as evidenced by the lack of holes, eroded areas, local melting or broken grains.

While there has been shown and described what is at present considered the preferred embodiment of the invention, it will be obvious to those skilled in the art that various changes and modifications may be made therein without departing from the scope of the invention as defined by the appended claims.

What is claimed is:

1. A method for manufacturing a multilayer electrical component comprising the steps of:

providing at least one layer of a particulate metal electrode in a first organic binder;

providing at least a second layer of a particulate ceramic dielectric in a second organic binder adjacent said layer of particulate metal electrode;

alternating said first and said second layers to produce a multilayer lamination;

heating said lamination to remove said organic binders from said lamination;

packing said lamination in a refractory insulating material; sintering said particulate metal layer and said particulate ceramic dielectric in said lamination by directly heating with microwave radiation;

and attaching leads to said metal electrodes of said lamination.

2. The method of claim 1 wherein said particulate metal electrode is an alloy of palladium and silver.

3. The method of claim 1 wherein said particulate metal electrode has a melting point in the range from 1000° C. to 1400° C.

4. The method of claim 1 wherein said ceramic dielectric possesses the capacitance versus temperature electrical characteristics defined by EIA specification RS198-C and is selected from the group consisting of Z5U, NPO, Y5F, Y5U, S2L, S2M, X7R and COG.

5. The method of claim 1 wherein said ceramic dielectric is barium titanate.

6. The method of claim 1 wherein said ceramic dielectric is neodymium titanate.

7. The method of claim 1 wherein said packing material is selected from the group consisting of zirconia, yttria, boron nitride, aluminum nitride and combinations thereof.

8. The method of claim 1 wherein said step of sintering is done in an air atmosphere.

9. The method of claim 1 wherein said step of sintering is performed in a ceramic crucible.

10. The method of claim 2 wherein the percentage by weight of palladium in said electrode has a range from about 90% to 0%.

11. The method of claim 2 wherein the percentage by weight of silver in said electrode has a range from about 10% to 100%.

12. A method for manufacturing a multilayer electrical component comprising the steps of:

forming a ceramic dielectric tape;

printing a plurality of particulate metal electrodes on said dielectric tape to form a bilayer structure;

fabricating a lamination by bonding a plurality of bilayer structures together;

cutting said lamination into a plurality of discrete multilayer structures;

packing said multilayer structures in a refractory insulating material; and sintering by microwave radiation said metal electrodes and said ceramic dielectric tape in said multilayer structures to form said components.

13. The method of claim 12 wherein said particulate metal electrode is an alloy of palladium and silver.

14. The method of claim 12 wherein said ceramic dielectric possesses the capacitance versus temperature electrical characteristics defined by EIA specification RS198-C and is selected from the group consisting of Z5U, NPO, Y5F, Y5U, S2L, S2M, X7R and COG.

15. The method of claim 12 wherein said ceramic dielectric is barium titanate.

16. The method of claim 12 wherein said ceramic dielectric is neodymium titanate.

17. The method of claim 12 wherein said insulating material is selected from the group consisting of zirconia, yttria, boron nitride, aluminum nitride and combinations thereof.

18. The method of claim 12 wherein said step of sintering is done in an air atmosphere.

19. The method of claim 12 wherein said step of sintering is performed in a ceramic crucible.

20. The method of claim 13 wherein the percentage by weight of palladium in said electrode has a range from about 90% to 0%.

21. The method of claim 13 wherein the percentage by weight of silver in said electrode has a range from about 10% to 100%.

* * * * *